US011631165B2

(12) United States Patent
Lutich et al.

(10) Patent No.: US 11,631,165 B2
(45) Date of Patent: Apr. 18, 2023

(54) REPAIR ESTIMATION BASED ON IMAGES

(71) Applicant: Sachcontrol GmbH, Dresden (DE)

(72) Inventors: Andrey Lutich, Dresden (DE); Lars Rietzschel, Bannewitz (DE)

(73) Assignee: SACHCONTROL GMBH, Dresden (DE)

( * ) Notice: Subject to any disclaimer, the term of this patent is extended or adjusted under 35 U.S.C. 154(b) by 304 days.

(21) Appl. No.: 16/779,105

(22) Filed: Jan. 31, 2020

(65) Prior Publication Data
US 2021/0241439 A1 Aug. 5, 2021

(51) Int. Cl.
G06K 9/62 (2022.01)
G06F 16/583 (2019.01)
G06T 7/00 (2017.01)
G06Q 10/20 (2023.01)
G06V 20/00 (2022.01)

(52) U.S. Cl.
CPC ........ G06T 7/0002 (2013.01); G06F 16/5854 (2019.01); G06K 9/6261 (2013.01); G06Q 10/20 (2013.01); G06V 20/00 (2022.01)

(58) Field of Classification Search
None
See application file for complete search history.

(56) References Cited

U.S. PATENT DOCUMENTS

2018/0260793 A1* 9/2018 Li .......................... G06N 3/084
2018/0350163 A1* 12/2018 Pofale .................. G07C 5/0808
2019/0147284 A1* 5/2019 Gavrilyuk ................. G06T 7/73
382/103
2019/0197442 A1* 6/2019 Lu ...................... G06Q 20/4016
2020/0143212 A1* 5/2020 Okazaki ............... G06K 9/6271

FOREIGN PATENT DOCUMENTS

| KR | 10-2109882 B1 * | 3/2021 | ............... G06N 3/08 |
| WO | WO-2017055878 A1 * | 4/2017 | ........... G06K 9/3241 |
| WO | WO-2018191421 A1 * | 10/2018 | ........... G06K 9/3233 |

OTHER PUBLICATIONS

Cha—Y.J.—"Autonomous Structural Visual Inspection Using Region-Based Deep Learning for Detecting Multiple Damage Types"—ResearchGate—Nov. 2017, pp. 1-17 (Year: 2017).*

(Continued)

Primary Examiner — Bernard Krasnic
(74) Attorney, Agent, or Firm — Baker Botts L.L.P.

(57) ABSTRACT

In one embodiment, a method includes accessing an image of a damaged object. The method further includes determining, using a plurality of image segmentation models, a plurality of objects in the image. The method further includes determining, using a plurality of visual inference models and the determined plurality of objects from the image segmentation models, a repair-relevant property vector for the damaged object in the image. The repair-relevant property vector includes a plurality of damaged object properties. The method further includes generating a repair report using the repair-relevant property vector and a price catalogue. The repair report includes an indication of the damaged object and a price associated with the repair or replacement of the damaged object. The method further includes providing the generated report for display on an electronic display device.

18 Claims, 9 Drawing Sheets

(56) References Cited

OTHER PUBLICATIONS

Turol, S.—"Automotive Insurance with TensorFlow: Estimating Damage / Repair Costs"—Feb. 28, 2018, pp. 1-11 (Year: 2018).*
Scene Parsing, http://sceneparsing.csail.mit.edu, Jun. 21, 2017.
"Title: DeepLab: Semantic Image Segmentation with Deep Convolutional Nets, Atrous Convolution, and Fully Connected CRFs." https://arxiv.org/abs/1606.00915, 2017.
"Title: Deep Visual-Semantic Alignments for Generating Image Descriptions." https://arxiv.org/abs/1412.2306, 2015.

* cited by examiner

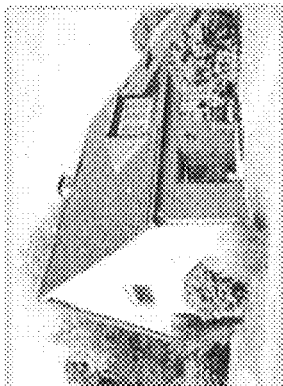
FIG. 3A
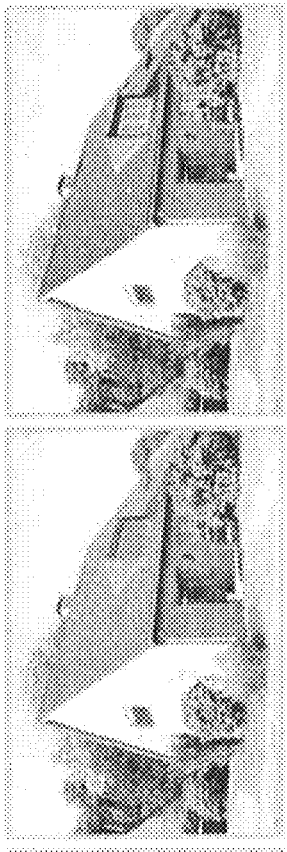
FIG. 3C
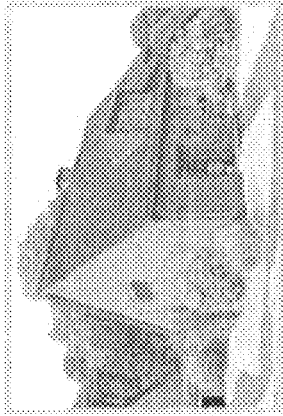
FIG. 3E
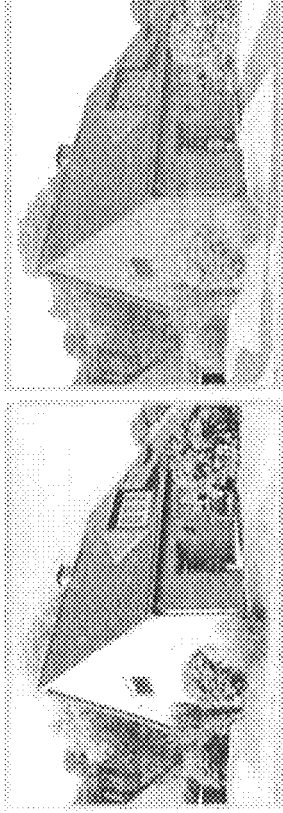
FIG. 3G
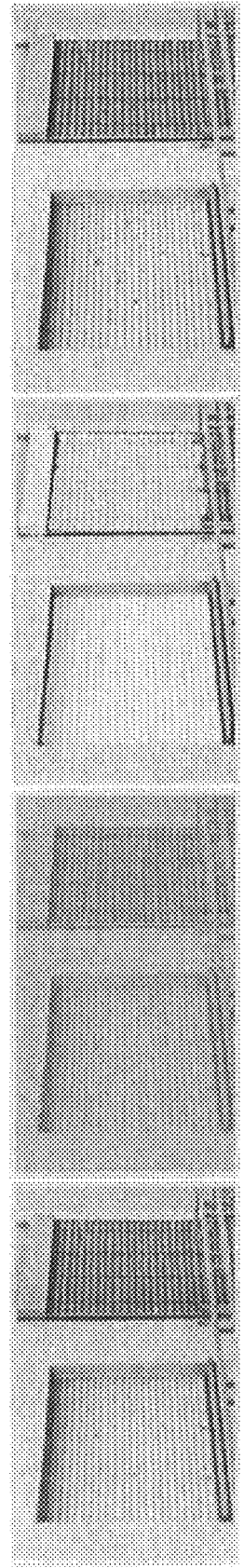
FIG. 3B
FIG. 3D
FIG. 3F
FIG. 3H

REPAIR ESTIMATION BASED ON IMAGES

TECHNICAL FIELD

This disclosure generally relates to image analysis, and more particularly to repair estimation based on images.

BACKGROUND

The insurance claim settlement process is an important process between an insurer and an insurance policy holder. This settlement process typically includes intensive data exchange between both parties. The types of exchanged data can be very diverse and usually include structured information transmitted via web forms or audio telephone communications, as well as unstructured or weakly structured data delivered in the form of free texts, repair invoices, service offers, and photos of damaged objects. Photos of damaged objects are particularly valuable because they usually appear at the early stages of the settlement process.

SUMMARY OF PARTICULAR EMBODIMENTS

In one embodiment, a method includes accessing an image of a damaged object. The method further includes determining, using a plurality of image segmentation models, a plurality of objects in the image. The method further includes determining, using a plurality of visual inference models and the determined plurality of objects from the image segmentation models, a repair-relevant property vector for the damaged object in the image. The repair-relevant property vector includes a plurality of damaged object properties. The method further includes generating a repair report using the repair-relevant property vector and a price catalogue. The repair report includes an indication of the damaged object and a price associated with the repair or replacement of the damaged object. The method further includes providing the generated report for display on an electronic display device.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

For a more complete understanding of the particular embodiments, and the advantages thereof, reference is now made to the following written description taken in conjunction with the accompanying drawings, in which:

FIGS. 3A-3H illustrate image segmentation that may be performed by the visual intelligence engine of FIG. 2, according to some embodiments;

DESCRIPTION OF EXAMPLE EMBODIMENTS

The insurance claim settlement process is an important process between an insurer and an insurance policy holder. This settlement process typically includes intensive data exchange between both parties. The types of exchanged data can be very diverse and usually include structured information transmitted via web forms or audio telephone communications, as well as unstructured or weakly structured data delivered in the form of free texts, repair invoices, service offers, and photos of damaged objects. Photos of damaged objects are particularly valuable because they usually appear at the early stages of the settlement process. Photos are information rich and can be taken by policy holders without the need for any special equipment or skillset. Therefore, having computers understand images and to automatically extract damage/repair relevant information is a crucial step towards enabling high-quality automation of the claim settlement process.

Recent advances in image understanding by means of deep convolutional neural networks, at first glance, seem to offer a good solution for automatically analyzing images in the claims process. However, in practice, training such a system end-to-end is not feasible because of the extreme complexity of the "conclusion making process" while mapping images and the sets of desired answers. To make a computer system to learn this complexity using any existing deep learning technique (e.g. backpropagation, reinforcement learning, adversarial learning, etc.) would require an enormous amount of training data samples. These data currently do not exist and are too expensive to generate. Furthermore, such a solution typically lacks the reasoning component on the predictions made, which is a significant drawback in the context of the negotiation character of the settlement process. Although the bare accuracy performance of AI systems may surpass human experts in many cases, the prediction of such systems is difficult to use for negotiations because of the missing argumentation that humans are used to seeing.

To address these and other problems, the embodiments of the disclosure provide systems and methods for providing repair steps and cost estimations of damaged objects (e.g, during an insurance claim process) based on photo images. More specifically, some embodiments of the disclosure modular provide an image interpretation system which is constructed to allow separate training of individual models (e.g., image segmentation models and visual inference models) and is easily expandable. These and other features are described in more detail below in reference to the included FIGURES.

Figure 1:
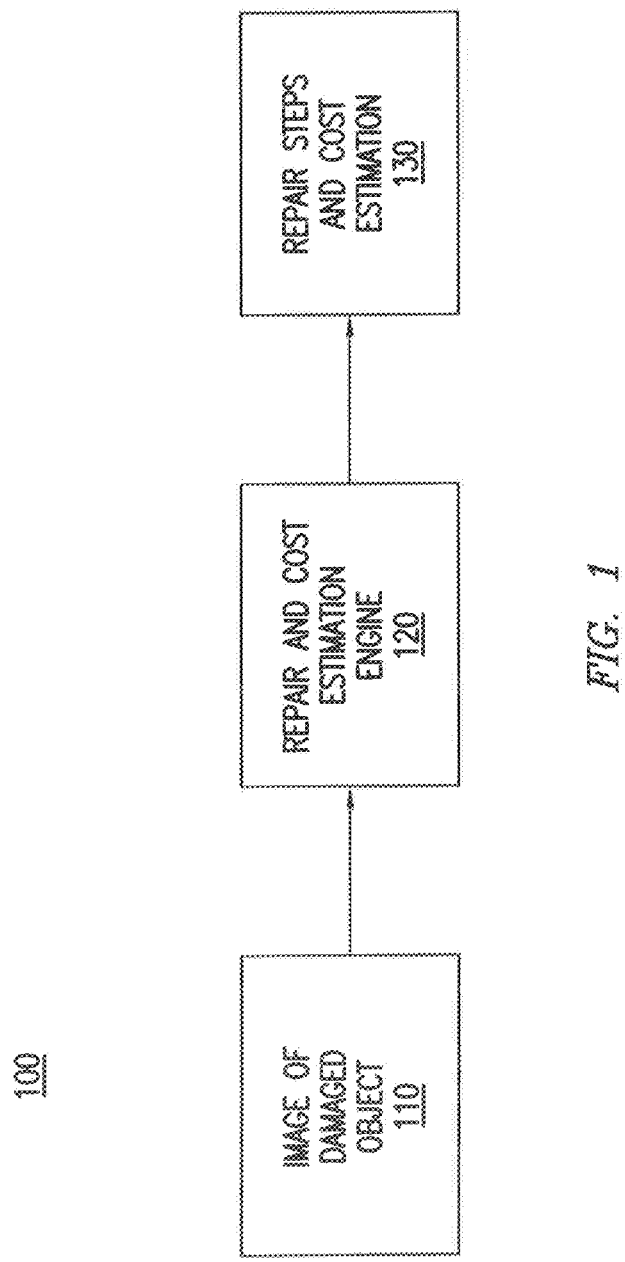
FIG. 1 illustrates a repair and cost estimation system, according to some embodiments.

FIG. 1 is a block diagram illustrating an example repair and cost estimation system 100, according to certain embodiments. Repair and cost estimation system 100 includes a visual intelligence engine 120. In general, visual intelligence engine 120 analyzes a damaged object image 110 (e.g., an image of a presumably damaged property object) and produces a repair steps and cost estimation report 130. Repair steps and cost estimation report 130 may include, for example: (i) a list of insurance-relevant objects present in damaged object image 110, (ii) a state of each object (intact, damaged, old, etc.), and (iii) costs associated with the repair or replacement of the identified damaged objects in damaged object image 110. By analyzing damaged object image 110 automatically and producing repair steps and cost estimation report 130, repair and cost estimation system 100 offers significant advantages to all stakeholders of the claim settlement process by making it faster, more accurate, and more transparent. An example of visual intelligence engine 120 is described in detail below in reference to FIG. 2, and an example of repair steps and cost estimation report 130 is described in reference to FIG. 5B.

Figure 2:
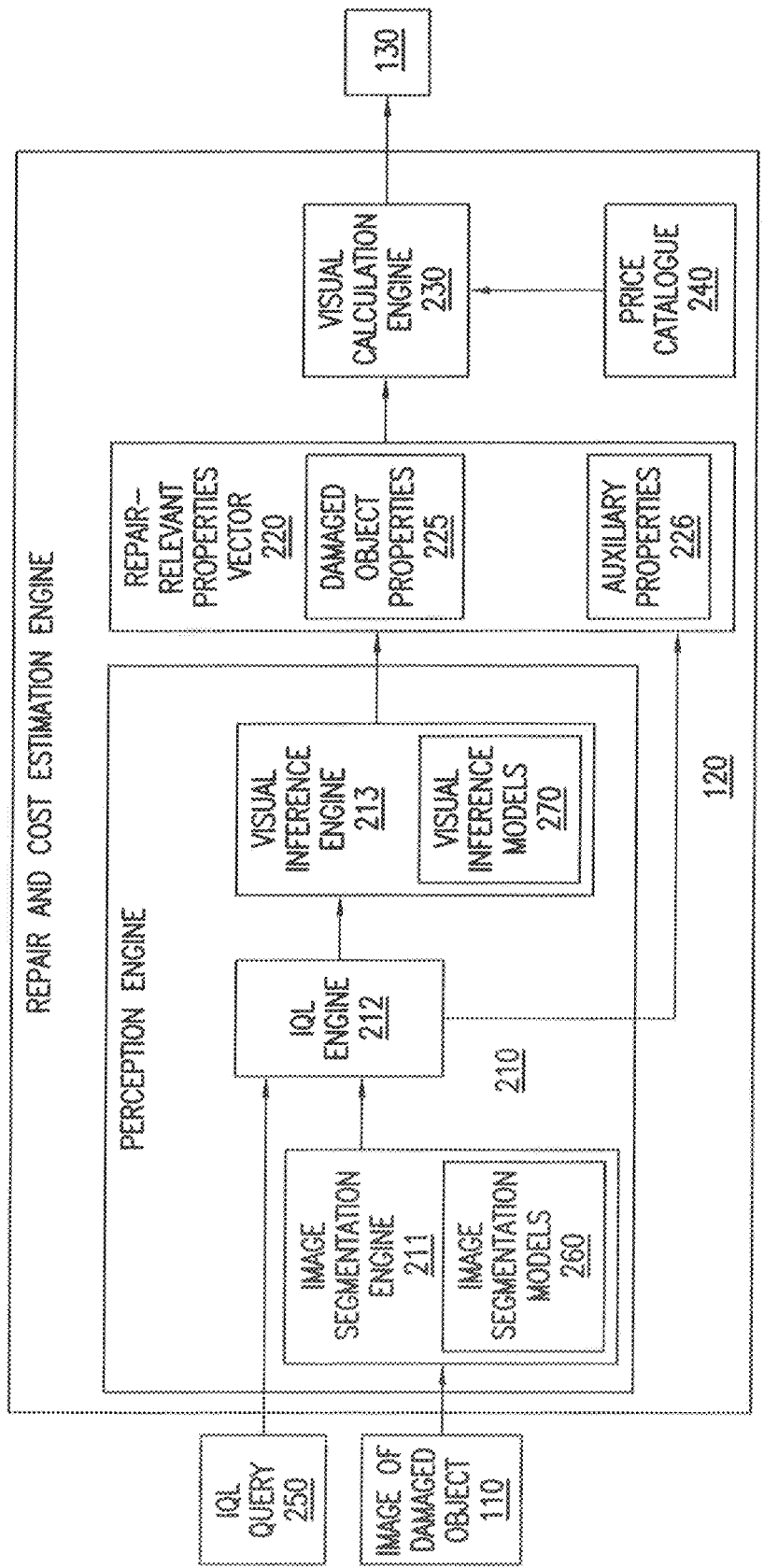
FIG. 2 illustrates a visual intelligence engine that may be used by the repair and cost estimation system of FIG. 1, according to some embodiments.

FIG. 2 illustrates a visual intelligence engine 120 that may be used by repair and cost estimation system 100 of FIG. 1, according to some embodiments. In some embodiments, visual intelligence engine 120 includes a perception engine 210, properties vector 220, a visual calculation engine 230, and a price catalogue 240. In general, visual intelligence engine 120 employs a modular configuration in order to reduce the amount of data required to set up image-understanding/repair-pricing algorithms and to enable the interpretability of the results. This reduces the required computing and memory requirements and enables high-quality automation of the claim settlement process. First, visual intelligence engine 120 splits the task of deriving pricing from images in two isolated parts by introducing a formal vector of repair-relevant properties (i.e., repair-relevant properties vector 220). This vector serves the purpose of decoupling the image perception part (i.e., perception engine 210) from the repair calculation algorithms (i.e., visual calculation engine 230). Perception engine 210 is responsible for image understanding by means of image segmentation models (i.e., in image segmentation engine 211). Perception engine 210 also performs extraction of qualitative and quantitative properties required for damage understanding and repair estimation. The repair understanding part of visual intelligence engine 120 (i.e., visual calculation engine 230) accepts as input structured data extracted by perception engine 210 and fed through the interface defined by the vector of repair-relevant properties (i.e., properties vector 220). Visual calculation engine 230 is responsible for deriving repair algorithms based on the object properties and price catalogue 240. In some embodiments, visual calculation engine 230 uses rules and repair logic defined by human experts in the domain of property construction and repair. The input required by visual calculation engine 230 defines elements and structure of the interface between both parts of visual intelligence engine 120.

In some embodiments, perception engine 210 utilizes two types of models: image segmentation models 260 (in image segmentation engine 211) and visual inference models 270 (in visual inference engine 213). The image segmentation models 260 that may be used in image segmentation engine 211 are based on image segmentation methods and primarily enable image segmentation engine 211 to identify and isolate objects of interest within damaged object image 110. Image segmentation models 260 are built to function in a layered/hierarchical way and are critical for extracting relationships between objects and their parts. Image segmentation models 260 also allow the fine-tuning of object selection in images using Image Query Language (IQL) engine 212. In some embodiments, image segmentation models 260 make use of the spatial relations between objects on different hierarchy levels. Image segmentation models 260 are described in more detail below in reference to image segmentation engine 211.

Image segmentation engine 211 uses image segmentation models 260 to detect objects within damaged object image 110 and relationships between the detected objects. In general, image segmentation engine 211 assigns labels to individual pixels of damaged object image 110. In some embodiments, every pixel and every object (group of connected pixels with the same label) segmented in damaged object image 110 may belong to only one label at a time. For example, FIGS. 3A-3H illustrate image segmentation that may be performed by image segmentation engine 211. As a specific example with reference to FIG. 3C, image segmentation engine 211 may utilize image segmentation models 260 to identify certain scene objects in damaged object image 110 (e.g., buildings, sky, grass, plants, etc.). As another specific example with reference to FIG. 3E, image segmentation engine 211 may utilize image segmentation models 260 to identify certain objects of the identified building in damaged object image 110 (e.g., roof, window, dormer, etc.). As yet another specific example with reference to FIG. 3H, image segmentation engine 211 may utilize image segmentation models 260 to identify damage to certain objects in damaged object image 110 (e.g., holes, dents, etc.). These and other methods performed by image segmentation engine 211 are described in more detail below.

Image segmentation is the process of image classification at the pixel level. In some embodiments, every pixel of an incoming image (e.g., damaged object image 110) is assigned a label using image segmentation models 260. In some embodiments, any appropriate image segmentation architecture may be used by image segmentation engine 211 that is suitable for semantic scene parsing. For example, DeepLab implemented in TensorFlow may be used in some embodiments. In contrast to image classification, where labels are assigned to entire images, the results of image segmentation (i.e., where pixels are assigned labels) provide considerably deeper insight into image content. For example, using segmentation masks makes it possible to estimate the main object being photographed by comparing relative area occupied by various objects in the image. Objects occupying larger areas in an image are likely to be playing important role in the scene being photographed. Objects taking a small (e.g., just a few percent) of the pixels image are often, but not always, playing a minor role. Thus, determining the relative areas (e.g., pixel amounts) occupied by various objects in images enables much more granular business logic compared to entire image classification.

In general, training any image segmentation model, regardless of its internal structure, requires massive pixels-level annotated data. There have been several image datasets annotated and released under the Creative-Commons-License (CCL) by the computer vision community in different quality and based on every different annotation convention. In some embodiments, such datasets are utilized by visual intelligence engine 120 after thorough cleaning, pre-processing and unification in order to understand objects such as buildings, people, vehicles, etc. Although preprocessing available data to a common standard is difficult, generating a sufficient amount of training data for new, less common object types presents a much bigger challenge. This challenge is two-fold. First, one needs a sufficient number of images of a particular object of interest with a large degree of variation in the object itself, view angle, illumination and camera properties. While obtaining such images might not necessarily be a challenge for businesses having to deal with photos in the context of their currently existing property-related repair processes, selecting the correct images is trickier. Second, selected images must be consistently annotated across newly added and previously existing objects. High quality, dense, and consistent image annotations are key to training well-performing segmentation models. To this end, certain embodiments of visual intelligence engine 120 utilize an image database of real-world photos of damaged property objects in their natural context. The images in this database are very diverse, have greatly varying quality and camera orientation settings, and contain many different lighting conditions.

Image segmentation models 260 are used by image segmentation engine 211 to assign semantic labels (e.g., such as illustrated in FIGS. 3A-3H) to damaged object image 110 on the pixel level. A typical approach to this problem is to map images to image captions. In some cases, systems may utilize algorithms that train hybrid CNN-RNN neural networks for captioning images by free-form text sentences as a human would do. These algorithms map unstructured information from images into unstructured, free-form text captions. However, such captions are difficult to use as input to downstream business processes and, therefore, must be converted to a more structured form. On the other hand, image segmentation engine 211 avoids the step of generating text captions from images. Instead, image segmentation engine 211 extracts structured information from damaged object image 110 images directly using image segmentation models 260.

Image segmentation models 260 are designed to assign individual image pixels to single labels (e.g., such as illustrated in FIGS. 3A-3H). In some embodiments, every pixel and every object (group of connected pixels with the same label) segmented in damaged object image 110 may belong to one and only one label at a time. However, in contrast to this simplified treatment, human perception and interpretation of images relies strongly on "seeing" some objects belonging to different semantic categories at the same time, or "understanding" one being a part of another one. To artificially implement this important peculiarity of human image perception process, some embodiments train several image segmentation models 260 that enable assignment of the same pixel or group of pixels in an image to different labels. For example, certain embodiments include three layers of image segmentation models 260 as illustrated in FIGS. 3C-3H. As illustrated in FIGS. 3C-3D, a first layer ("L0") of image segmentation may perform general scene understanding, as illustrated in FIGS. 3E-3F, a second layer ("L1") of image segmentation may perform object-of-interest detection, and as illustrated in FIGS. 3G-3H, a third layer ("L2") of image segmentation may perform damage localization. To combine and efficiently use segmentation results generated at different levels in image segmentation engine 211, some embodiments utilize IQL engine 212 that converts typical human language questions into queries. IQL engine 212 is discussed in more detail below.

In general, IQL engine 212 addresses questions posed to damaged object image 110 by finding spatial relationships between various segmented objects in damaged object image 110. In some embodiments, the core of IQL engine 212 is based on Boolean operations (e.g., Or, And, Not, Xor) that are applicable to objects discovered by image segmentation engine 211 on a per object basis. In certain embodiments, IQL engine 212 may additionally include other mathematical helper functions (e.g., Area, Count etc.) as well as spatial relation functions (e.g., Interact, Near, Not-Near etc) that can be applied as additional constrains to 2D geometrical shapes. As a specific example for illustrative purposes, a human language question regarding damaged object image 110 in FIG. 3B may be "Is the shutter damaged." A human answer to this question would be "Yes, the shutter has holes over its surface." The output of IQL engine 212 would be "True, area (shutter U holes) !=0." Other examples of human questions and corresponding outputs of IQL engine 212 are shown below in TABLE 1:

| | |
|---|---|
| How many shutters are in the photo? | 2, count(shutter) |
| Is the shutter on the ground floor? | True, area(grass $\lor$ earth) >= 0.1 |
| Is the shutter mounted from outside? | True, area(shutter box) != 0 |

In some embodiments, IQL engine 212 operates on the output of image segmentation engine 211. In other embodiments, IQL engine 212 can optionally be invoked on damaged object image 110 before damaged object image 110 is passed to repair and cost estimation system 100. In general, IQL engine 212 is a language that an external user can use to program repair and cost estimation system 100 to return specific objects discovered in damaged object image 110 according to specified criteria. This approach offers unprecedented flexibility to users by allowing combinations of predefined objects known by image segmentation models 260 to be used for the selection process. Overall, IQL engine 212 decouples the business logic applied to the results of image segmentation from the process of image segmentation itself.

Visual inference engine 213 applies models of a second type (i.e., visual inference models 270) to the objects identified by image segmentation models 260 (e.g., regions marked by image segmentation models 260 within damaged object image 110). In general, visual inference models 270 are used to derive repair-relevant properties vector 220 for detected objects within damaged object image 110 after objects of interest have been cut out by image segmentation models 260 and in some embodiments, fine-selected using IQL engine 212. In some embodiments, visual inference models 270 are regressor and/or classifier type models. In some embodiments, visual inference models 270 are AlexNet and VGG-16 network backbones (or customized versions thereof). In some embodiments, repair-relevant properties vector 220 are any optically-recognizable parameters that are relevant to the repair process and may include damaged object properties 225 and auxiliary properties 226. Damaged object properties 225 may include any relevant properties of a damaged object within damaged object image 110 such as type, size, material, color, etc. Auxiliary properties 226 may include any auxiliary properties such as floor, mount, age, etc.

In some embodiments, the properties inferred by visual inference engine 213 (i.e., damaged object properties 225 and/or auxiliary properties 226) are defined by domain experts based on the knowledge needed to perform repair calculations. Depending on the particular object being repaired, these properties may include any appropriate object properties such as material, surface type, method of mounting, color, object dimensions, etc. In some embodiments, visual inference models 270 are trained using annotated data (e.g., 1-10 k training examples) in order to achieve accurate results.

Figure 4B:
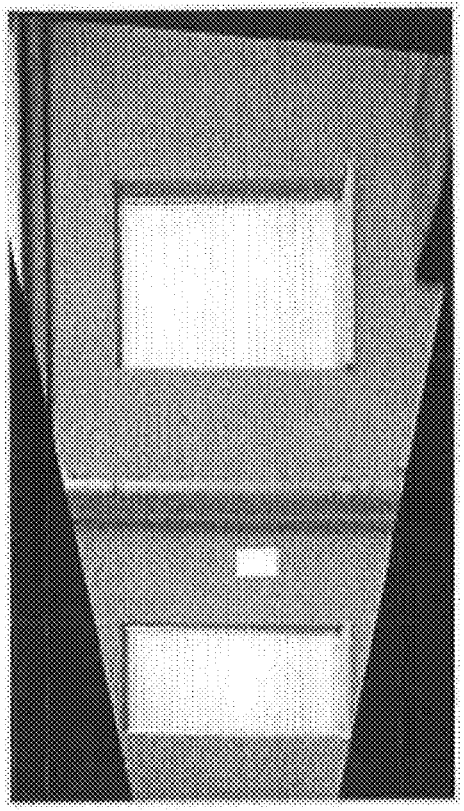
FIGS. 4A-4B illustrate image perspective correction that may be performed by the visual intelligence engine of FIG. 2, according to some embodiments.
Figure 4A:
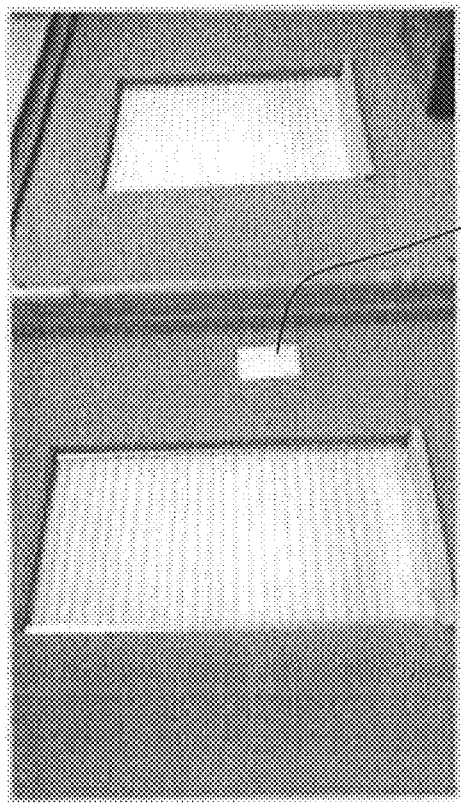

In general, building models to predict actual absolute dimensions of arbitrarily photographed objects is a challenge. The process is further complicated by the fact that taking a photo compresses information of the 3D world down to two dimensions of a planar image. Most importantly, depth information (the distance to objects being photographed) is not recorded by most cameras, which makes it very difficult or impossible to map distances in the image plane to real-world dimensions. Assuming that the depth information is not available, one option to enable this mapping is to use references present in the image itself. In some embodiments, deep convolutions neural networks are used in the regression setting to learn these references using expert annotated object dimensions data on the per-object basis. This method has optimal performance on frontal view images (i.e., images where an object's surface is perpendicular to the camera). For damaged object image 110 with oblique views (i.e., objects with surfaces not perpendicular to the camera), perspective correction may be performed as illustrated in FIGS. 4A-4B. FIG. 4A illustrates damaged object image 110 with oblique views, and FIG. 4B illustrates damaged object image 110 after perspective correction. In some embodiments, any object 410 with known dimensions may be physically placed into the scene prior to capturing damaged object image 110. For example, an A4 piece of paper may be placed into the scene in order to perform perspective correction and to map corrected image pixel dimensions to a real-world scale. Using an object with known dimensions as a reference allows performing perspective correction and the measuring of surface areas of planar objects in images with relative accuracy.

If damaged object image 110 does not include a pre-defined reference object, it is not easy or even possible to determine absolute object dimensions because of irreversible loss of information in most images. On the other hand, domain experts are able to make reasonable estimates of object sizes and areas based on indirect references available in images as well as their knowledge of dimensional constrains and possible size options. Certain embodiments mimic this estimation process by training CNN-based regression models that accept an image of a particular pre-defined object as input and infer lateral dimension and/or area of the object's surface.

Figure 5A:
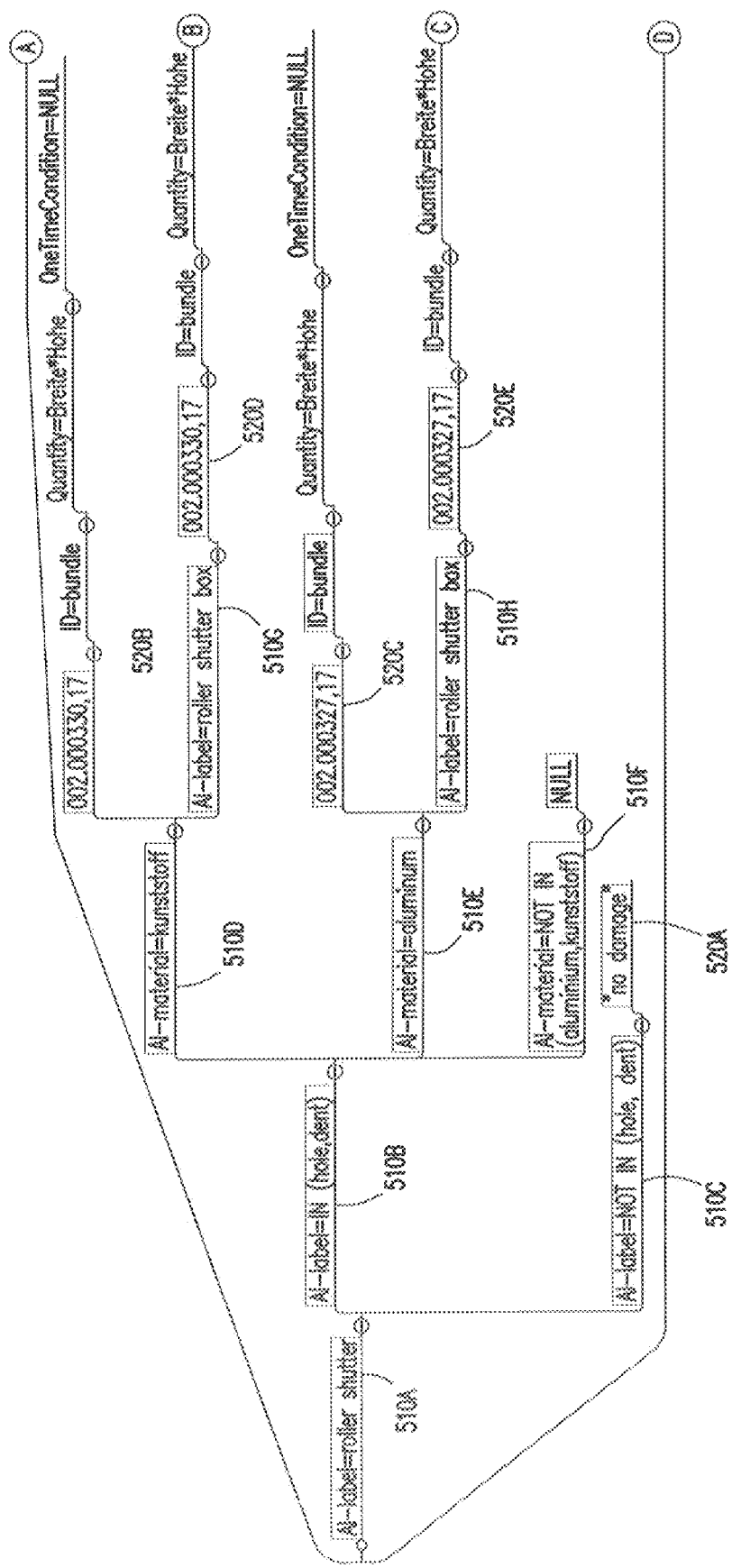
FIGS. 5A-5B illustrate mapping of optical recognizable parameters to repair items, according to some embodiments.

Visual calculation engine 230 includes logic or algorithms for mapping visual parameters (e.g., damaged object properties 225 and auxiliary properties 226) into repair steps and outputting repair steps and cost estimation report 130. In general, the inputs to visual calculation engine 230 include optical recognizable parameters of image segmentation (e.g., objects, attributes, quantities, repair methods, etc.) and other parameters obtained from image metadata or other input that has an impact on repair costs (e.g., country, zip code, date, etc.) The outputs of visual calculation engine 230 include object-attribute related and non-related calculation items, object quantity dependent and quantity independent items, and object quantity, zip-code, and date dependent prices based on mathematical/statistical algorithms on real historic market prices. In some embodiments, visual calculation engine 230 aligns or otherwise compares damaged object properties 225 and auxiliary properties 226 with parameters of items in price catalogue 240. Parameters/attributes occurring in a certain combination can be linked to certain items from price catalogue 240. An example is illustrated in FIGS. 5A-B, which include optical recognizable parameters 510A-H (i.e., damaged object properties 225 and auxiliary properties 226) that have been linked with certain repair items 520A-G from price catalogue 240.

Figure 5B:
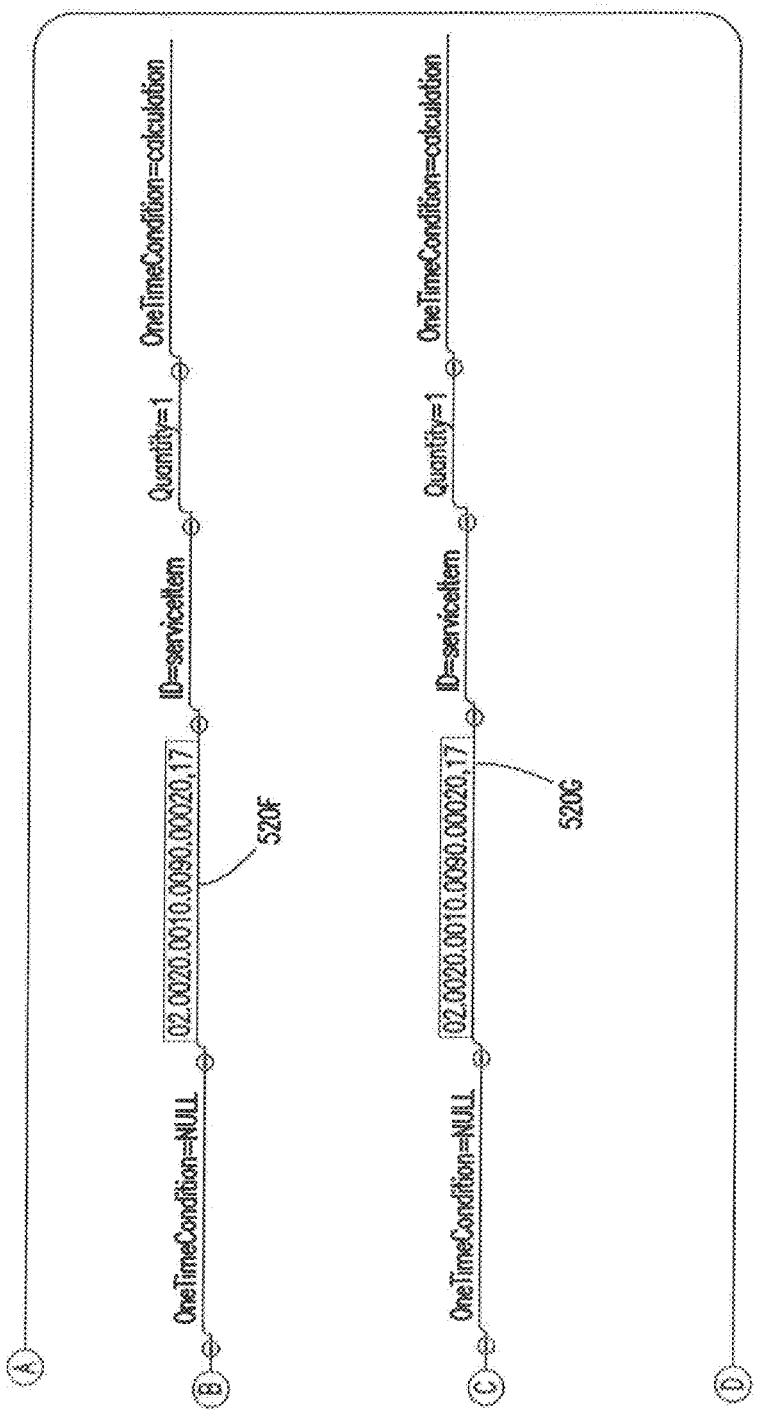
Figure 5C:
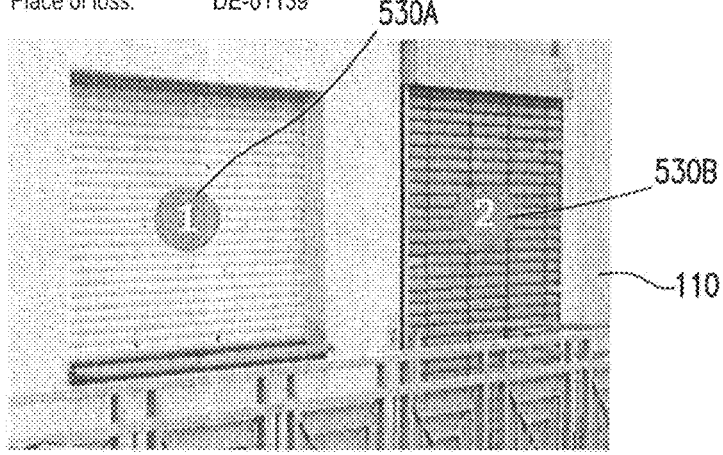
FIG. 5C illustrates a repair step and cost estimation report, according to some embodiments.

FIG. 5B illustrates an example repair steps and cost estimation report 130, according to some embodiments. In this embodiment, repair steps and cost estimation report 130 includes damaged object image 110 and objects 530A-B within damaged object image 110 that need repair. Damaged objects 530A-B are determined by repair and cost estimation system 100 using visual intelligence engine 120, as described above. Repair steps and cost estimation report 130 may be in any appropriate format. In some embodiments, repair steps and cost estimation report 130 is displayed in a graphical user interface on an electronic display device. In some embodiments, repair steps and cost estimation report 130 is in electronic document format (e.g., pdf, docx, etc.), but is not limited to being in electronic document format.

In some embodiments, repair steps and cost estimation report 130 includes a calculation table 540 as illustrated in FIG. 5B. Each line of calculation table 540 may correspond to one of the damaged objects 530. In some embodiments, each line of calculation table 5B may include a description of the damaged object 530, a unit measurement of the damaged object 530, a quantity, a unit price, and a total price to repair/replace the damaged object 530. In some embodiments, repair steps and cost estimation report 130 also includes a summary table 550 as illustrated in FIG. 5B. Summary table 550 provides a summary of all of the charges in calculation table 540.

Figure 6:
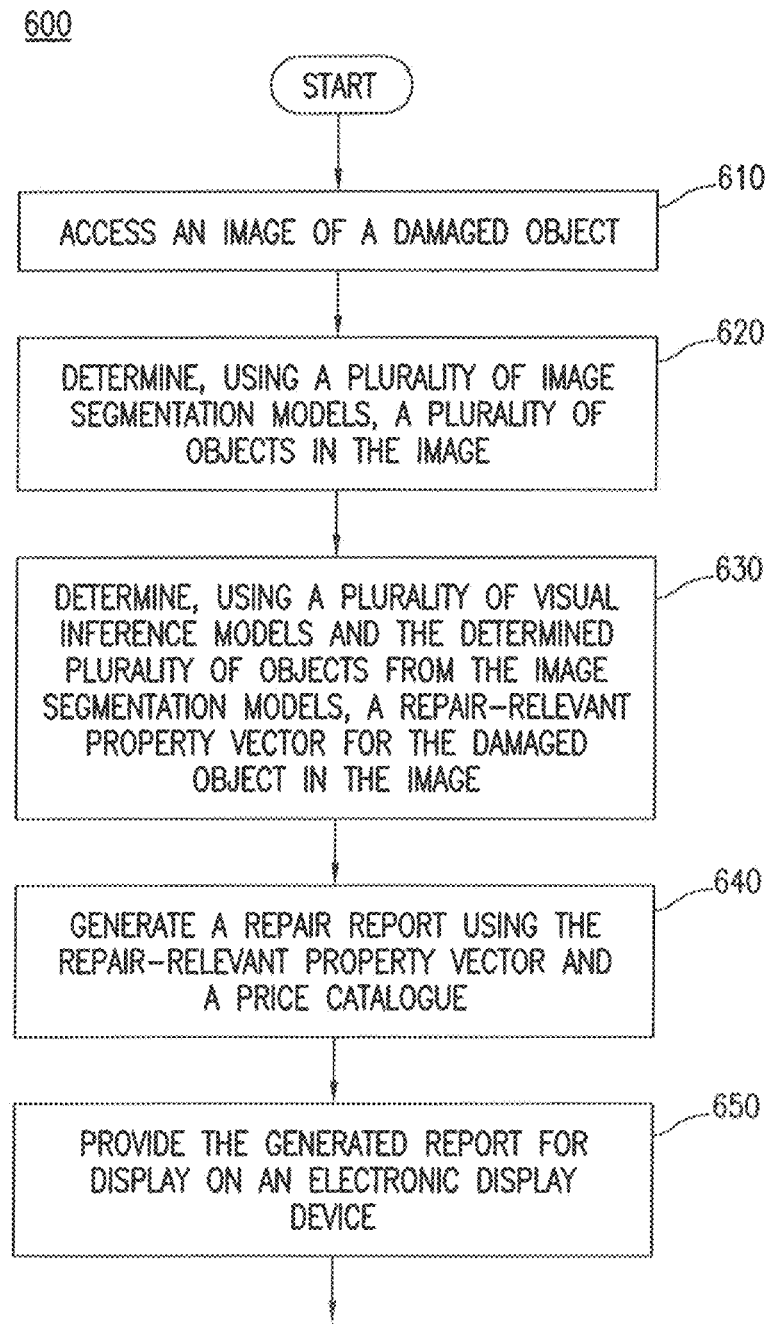
FIG. 6 illustrates a method that may be performed by the repair and cost estimation system of FIG. 1, according to some embodiments.

FIG. 6 illustrates an example method 600 that may be performed by repair and cost estimation system 100 of FIG. 1. At step 610, method 600 accesses an image of a damaged object. In some embodiments, the image is damaged object image 110. In some embodiments, the damaged object is any property that has been insured such as a building, a house, a vehicle, and the like. In some embodiments, the image accessed in step 610 may be stored in any appropriate memory and may be provided by, for example, a user who has suffered an insurable loss. For example, a user may capture the image using any appropriate device such as a smartphone, a laptop computer, a tablet computer, and the like.

At step 620, method 600 determines, using a plurality of image segmentation models, a plurality of objects in the image accessed in step 610. In some embodiments, the plurality of image segmentation models are image segmentation models 260. In some embodiments, the image segmentation models include DeepLab models implemented in TensorFlow. In some embodiments, step 620 includes applying a label from a plurality of labels to individual pixels of the image of the damaged object.

At step 630, method 600 determines, using a plurality of visual inference models and the determined plurality of objects from the image segmentation models of step 620, a repair-relevant property vector for the damaged object in the image. In some embodiments, the plurality of visual inference models are visual inference models 270. In some embodiments, the plurality of visual inference models are regressor type models or classifier type models. In some embodiments, the repair-relevant property vector is repair-relevant properties vector 220 and includes a plurality of damaged object properties. In some embodiments, the plurality of damaged object properties includes damaged object properties 225 and/or auxiliary properties 226.

At step 640, method 600 generates a repair report using the repair-relevant property vector of step 630 and a price catalogue. In some embodiments, the repair report is repair steps and cost estimation report 130. In some embodiments, the price catalogue is price catalogue 240. In some embodiments, the repair report includes an indication of the damaged object and a price associated with the repair or replacement of the damaged object. In some embodiments, the repair report further includes a state of each of the objects determined from the plurality of image segmentation models. The state may be, for example, "damaged" for damaged objects and "not damaged" for identified objects that are not damaged. In some embodiments, step 640 includes comparing the plurality of damaged object properties of the repair-relevant property vector with a plurality of items in the price catalogue as illustrated in FIGS. 5A-B.

At step 650, method 600 provide the report generated in step 640 for display on an electronic display device. For example, method 600 may electronically send the report for display on a user's mobile device (e.g., smartphone, tablet computer, etc.). After step 650, method 600 may end.

Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for performing repair estimation based on images including the particular steps of the method of FIG. 6, this disclosure contemplates any suitable method for performing repair estimation based on images including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6, including computer system 800 described below.

Figure 7:
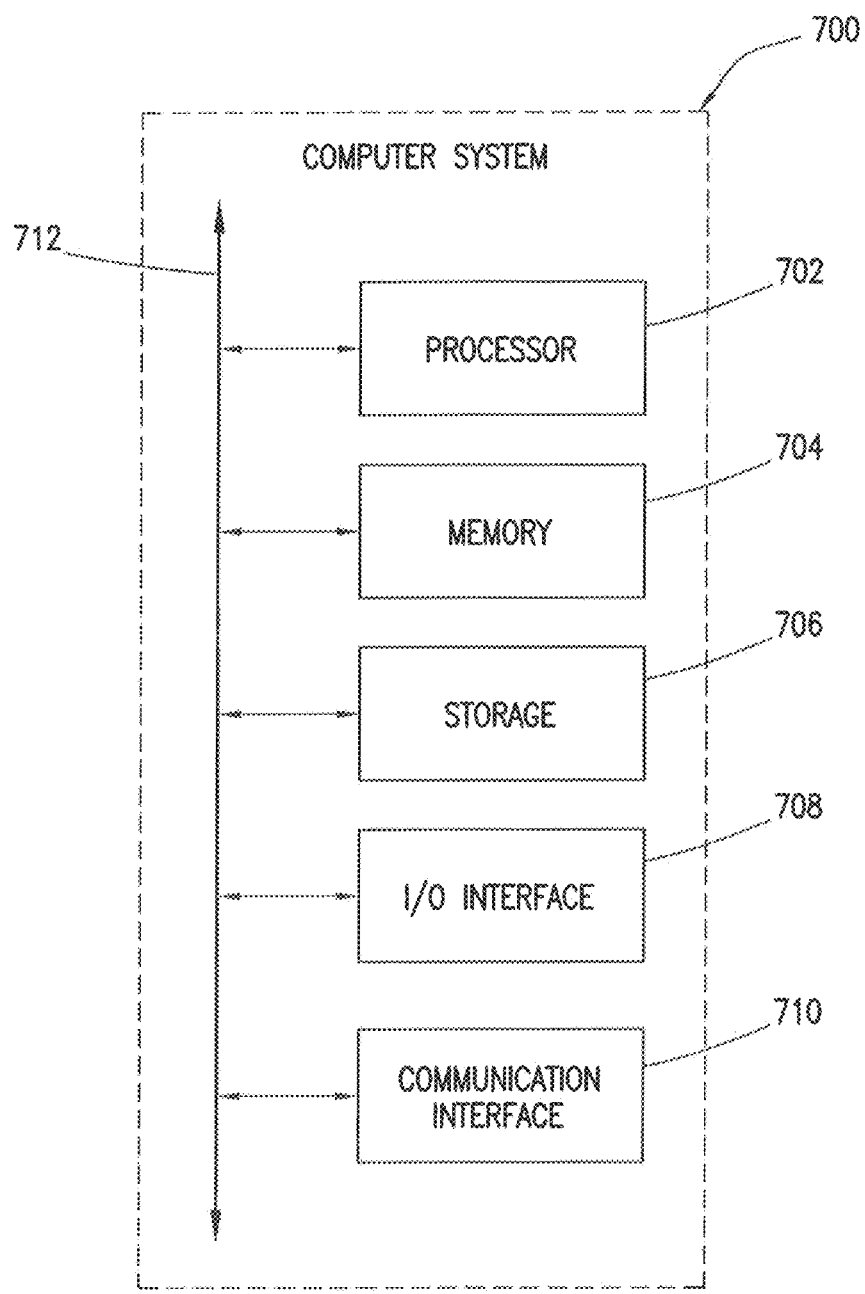
FIG. 7 illustrates an example computer system, according to some embodiments.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A system comprising:
one or more processors; and
one or more computer-readable non-transitory storage media coupled to one or more of the processors and comprising instructions configured when executed by one or more of the processors to cause the system to:
access an image of a damaged object;
determine, using a plurality of image segmentation models, a plurality of objects in the image;
determine, using an image query language engine, a plurality of spatial relationships between the plurality of objects in the image;
select, using the plurality of spatial relationships, one or more of the plurality of objects in the image;
determine, using a plurality of visual inference models and the selected one or more plurality of objects from the image query language engine, a repair-relevant property vector for the damaged object in the image, the repair-relevant property vector comprising a plurality of damaged object properties;
generate a repair report using the repair-relevant property vector and a price catalogue, the repair report comprising an indication of the damaged object and a price associated with the repair or replacement of the damaged object; and
provide the generated report for display on an electronic display device.

2. The system of claim 1, wherein the repair report further comprises a state of each of the objects determined from the plurality of image segmentation models.

3. The system of claim 1, wherein generating the repair report using the repair-relevant property vector and the price catalogue comprises comparing the plurality of damaged object properties of the repair-relevant property vector with a plurality of items in the price catalogue.

4. The system of claim 1, wherein determining the plurality of objects in the image using the plurality of image segmentation models comprises applying a label from a plurality of labels to individual pixels of the image of the damaged object.

5. The system of claim 1, wherein the plurality of image segmentation models comprises DeepLab implemented in TensorFlow.

6. The system of claim 1, wherein the plurality of visual inference models are:
regressor type models; or
classifier type models.

7. A method comprising:
by a computing device, accessing an image of a damaged object;
by the computing device, determining, using a plurality of image segmentation models, a plurality of objects in the image;
by the computing device, determining, using an image query language engine, a plurality of spatial relationships between the plurality of objects in the image;
by the computing device, selecting, using the plurality of spatial relationships, one or more of the plurality of objects in the image;
by the computing device, determining, using a plurality of visual inference models and the selected one or more plurality of objects from the image query language engine, a repair-relevant property vector for the damaged object in the image, the repair-relevant property vector comprising a plurality of damaged object properties;
by the computing device, generating a repair report using the repair-relevant property vector and a price catalogue, the repair report comprising an indication of the damaged object and a price associated with the repair or replacement of the damaged object; and
by the computing device, providing the generated report for display on an electronic display device.

8. The method of claim 7, wherein the repair report further comprises a state of each of the objects determined from the plurality of image segmentation models.

9. The method of claim 7, wherein generating the repair report using the repair-relevant property vector and the price catalogue comprises comparing the plurality of damaged object properties of the repair-relevant property vector with a plurality of items in the price catalogue.

10. The method of claim 7, wherein determining the plurality of objects in the image using the plurality of image segmentation models comprises applying a label from a plurality of labels to individual pixels of the image of the damaged object.

11. The method of claim 7, wherein the plurality of image segmentation models comprises DeepLab implemented in TensorFlow.

12. The method of claim 7, wherein the plurality of visual inference models are:
regressor type models; or
classifier type models.

13. One or more computer-readable non-transitory storage media embodying software that is configured when executed by one or more processors to:
access an image of a damaged object;
determine, using a plurality of image segmentation models, a plurality of objects in the image;
determine, using an image query language engine, a plurality of spatial relationships between the plurality of objects in the image;
select, using the plurality of spatial relationships, one or more of the plurality of objects in the image;
determine, using a plurality of visual inference models and the selected one or more plurality of objects from the image query language engine, a repair-relevant property vector for the damaged object in the image, the repair-relevant property vector comprising a plurality of damaged object properties;
generate a repair report using the repair-relevant property vector and a price catalogue, the repair report comprising an indication of the damaged object and a price associated with the repair or replacement of the damaged object; and
provide the generated report for display on an electronic display device.

14. The one or more computer-readable non-transitory storage claim 13, wherein the repair report further comprises a state of each of the objects determined from the plurality of image segmentation models.

15. The one or more computer-readable non-transitory storage claim 13, wherein generating the repair report using the repair-relevant property vector and the price catalogue comprises comparing the plurality of damaged object properties of the repair-relevant property vector with a plurality of items in the price catalogue.

16. The one or more computer-readable non-transitory storage claim 13, wherein determining the plurality of objects in the image using the plurality of image segmentation models comprises applying a label from a plurality of labels to individual pixels of the image of the damaged object.

17. The one or more computer-readable non-transitory storage claim 13, wherein the plurality of image segmentation models comprises DeepLab implemented in TensorFlow.

18. The one or more computer-readable non-transitory storage claim 13, wherein the plurality of visual inference models are:
regressor type models; or
classifier type models.

* * * * *